United States Patent
Jang et al.

(10) Patent No.: US 8,233,736 B2
(45) Date of Patent: Jul. 31, 2012

(54) DIGITAL PHOTOGRAPHING APPARATUS, METHOD OF CONTROLLING THE SAME, AND RECORDING MEDIUM HAVING RECORDED THEREON PROGRAM FOR EXECUTING THE METHOD

(75) Inventors: Soon-geun Jang, Changwon (KR); Jin-pyo Gwak, Changwon (KR); Eun-sun Ahn, Changwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 981 days.

(21) Appl. No.: 12/283,111

(22) Filed: Sep. 9, 2008

(65) Prior Publication Data

US 2009/0129701 A1  May 21, 2009

(30) Foreign Application Priority Data

Nov. 16, 2007  (KR) ........................ 10-2007-0117436

(51) Int. Cl.
*G06K 9/40* (2006.01)

(52) U.S. Cl. ....................... 382/260; 348/208.4; 382/284

(58) Field of Classification Search ........................ None
See application file for complete search history.

(56) References Cited

U.S. PATENT DOCUMENTS

| | | | |
|---|---|---|---|
| 5,649,032 A | 7/1997 | Burt et al. | |
| 7,486,318 B2 * | 2/2009 | Ohki | 348/276 |
| 2006/0158545 A1 * | 7/2006 | Hirai | 348/333.01 |
| 2006/0187308 A1 | 8/2006 | Lim et al. | |
| 2007/0223831 A1 | 9/2007 | Mei et al. | |
| 2008/0170126 A1 * | 7/2008 | Tico et al. | 348/208.6 |

FOREIGN PATENT DOCUMENTS

| | | |
|---|---|---|
| EP | 1 583 033 A2 | 10/2005 |
| JP | 2006-80784 A | 3/2006 |
| JP | 2007-257287 A | 10/2007 |

OTHER PUBLICATIONS

Examination Report established for GB 0817072.2 (Oct. 19, 2011).
Office Action established for CN 200810170614.9 (Feb. 22, 2012).

* cited by examiner

*Primary Examiner* — Jason M Repko
*Assistant Examiner* — Siamak Harandi
(74) *Attorney, Agent, or Firm* — Drinker Biddle & Reath LLP (57) ABSTRACT

A digital photographing apparatus, a method of controlling the digital photographing apparatus, and a recording medium having recorded thereon a program for executing the method are provided. The digital photographing apparatus includes: a data obtainer that obtains long exposure first data about a first image of a subject and short exposure second data about a second image of the subject; a third data generator that generates third data about a third image by warping the first data so that the subject of the first image and the subject of the second image match each other; and a second data amender which, when a predetermined condition is satisfied, amends the second data so that the second data value $S(x, y)$ at the pixel $(x, y)$ of the second image has the third data value $W(x, y)$ at the pixel $(x, y)$ of the third image.

23 Claims, 8 Drawing Sheets

DIGITAL PHOTOGRAPHING APPARATUS, METHOD OF CONTROLLING THE SAME, AND RECORDING MEDIUM HAVING RECORDED THEREON PROGRAM FOR EXECUTING THE METHOD

CROSS-REFERENCE TO RELATED PATENT APPLICATION

This application claims the benefit of Korean Patent Application No. 10-2007-0117436, filed on Nov. 16, 2007, in the Korean Intellectual Property Office, the entire contents of which is incorporated herein by reference.

BACKGROUND OF THE INVENTION

1. Field of the Invention

The present invention relates to a digital photographing apparatus, a method of controlling the same, and a computer readable recording medium having recorded thereon a program for executing the method. More particularly, the present invention relates to a digital photographing apparatus which can obtain a clear image even when the digital photographing apparatus shakes while a photograph is being taken, a method of controlling the apparatus, and a computer readable recording medium having recorded thereon a program for executing the method.

2. Description of the Related Art

A conventional digital photographing apparatus stores data about an image obtained by a photographing operation in a photographing mode in a storage medium. The apparatus also displays an image on a display portion of the apparatus by using the data stored in the storage medium.

As such digital photographing apparatuses become more widespread, demand for high quality images also increases. However, in the case of a conventional digital photographing apparatus, when the digital photographing apparatus shakes due to external vibration or due to a hand movement of a user, the resolution of a photographed image significantly deteriorates. Specifically, under low ambient light conditions, shutter speed decreases and, as a result, the time of exposing an imaging device of the digital photographing apparatus to light increases. Accordingly, the digital photographing apparatus shakes while the imaging device is exposed to light, and thus the resolution of the photographed image significantly deteriorates.

SUMMARY OF THE INVENTION

The present invention provides a digital photographing apparatus which can obtain a clear image even when the digital photographing apparatus shakes while a photograph is being taken, a method of controlling the apparatus, and a computer readable recording medium having recorded thereon a program for executing the method.

According to an embodiment of the present invention, there is provided a digital photographing apparatus, including: a data obtainer that obtains first data about a first image of a subject through long exposure, and second data about a second image of the subject through short exposure; a third data generator that generates third data about a third image by warping the first data obtained by the data obtainer so that the subject of the first image according to the first data obtained by the data obtainer and the subject of the second image according to the second data obtained by the data obtainer are matched together; and a second data amender which, when a third data value at a pixel (x, y) of the third image according to the third data generated by the third data generator is $W(x, y)$ and a second data value at a pixel (x, y) of the second image according to the second data obtained by the data obtainer is $S(x, y)$, and when $|W(x, y)-S(x, y)|$ or a value obtained by processing $|W(x, y)-S(x, y)|$ with regard to the pixel (x, y) of the second image satisfies a predetermined condition for amending the second data, amends the second data so that the second data value $S(x, y)$ at the pixel (x, y) of the second image has the third data value $W(x, y)$ at the pixel (x, y) of the third image.

The amended second data of the second image is stored, for example, in a storage medium as final data.

The second data amender determines, for example, whether the second data is amended, at each pixel (x, y) of the second image according to the second data obtained by the data obtainer, only when the corresponding third data value $W(x, y)$ at the pixel (x, y) of the third image according to the third data generated by the third data generator exists.

In an example of the predetermined condition, the pixel (x, y) of the second image according to the second data obtained by the data obtainer is in a bottom area of a pre-set first graph when the pixel (x, y) of the second image is shown on a coordinate system in which a horizontal axis is a gradient norm of $W(x, y)$ or a value obtained by processing a gradient norm of $W(x, y)$ and a vertical axis is $|W(x, y)-S(x, y)|$ or a value obtained by processing $|W(x, y)-S(x, y)|$, and the pixel (x, y) of the second image according to the second data obtained by the data obtainer may be in a bottom area of a pre-set second graph when the pixel (x, y) of the second image is shown on a coordinate system in which a horizontal axis is a gradient norm of $S(x, y)$ or a value obtained by processing a gradient norm of $S(x, y)$ and a vertical axis is $|W(x, y)-S(x, y)|$ or a value obtained by processing $|W(x, y)-S(x, y)|$.

In an example of the first graph, the values of the vertical axis do not decrease as the values of the horizontal axis increase.

The first graph, for example, sequentially includes a section where the values of the vertical axis are uniform even when the values of the horizontal axis increase and a section where the values of the vertical axis increase as the values of the horizontal axis increase.

In an example of the second graph, the values of the vertical axis do not decrease as the values of the horizontal axis increase.

The second graph, for example, sequentially includes a section where the values of the vertical axis are uniform even when the values of the horizontal axis increase and a section where the values of the vertical axis increase as the values of the horizontal axis increase.

In an example of the second graph, the values of the vertical axis do not increase as the values of the horizontal axis increase.

An example of the second graph sequentially includes a section where the values of the vertical axis decrease as the values of the horizontal axis increase, and a section where the values of the vertical axis may be uniform even when the values of the horizontal axis increase.

An example of the third data generator uses MPEG or H.264 technology.

According to another embodiment of the present invention, a method of controlling a digital photographing apparatus is provided. The method includes (a) obtaining first data about a first image of a subject through long exposure; (b) obtaining second data about a second image of the subject through short exposure; (c) generating third data about a third image by warping the first data about the first image so that the subject of the first image and the subject of the second image are matched together; and (d) when a third data value at a pixel (x, y) of the third image is W(x, y) and a second data value at a pixel (x, y) of the second image is S(x, y), and |W(x,y)−S(x, y)| or a value obtained by processing |W(x,y)−S(x,y)| with regard to the pixel (x, y) of the second image satisfies a predetermined condition, amending the second data value S(x, y) at the pixel (x, y) of the second image so that the second data value S(x, y) at the pixel (x, y) of the second image has the third data value W(x, y) at the pixel (x, y) of the third image.

An example of the method further includes (e) storing the second data of the second image amended in (d) in a storage medium as final data.

An example of part (d) of the above-described method is performed in each pixel (x, y) of the second image only when the third data value W(x, y) at the corresponding pixel (x, y) of the third image exists.

In an example of the predetermined condition, the pixel (x, y) of the second image is in a bottom area of a pre-set first graph when the pixel (x, y) of the second image is shown on a coordinate system in which a horizontal axis is a gradient norm of W(x, y) or a value obtained by processing a gradient norm of W(x, y) and a vertical axis is |W(x, y)−S(x, y)| or a value obtained by processing |W(x, y)−S(x, y)|, and the pixel (x, y) of the second image is in a bottom area of an example of a pre-set second graph when the pixel (x, y) of the second image is shown on a coordinate system in which a horizontal axis is a gradient norm of S(x, y) or a value obtained by processing a gradient norm of S(x, y) and a vertical axis is |W(x, y)−S(x, y)| or a value obtained by processing |W(x, y)−S(x, y)|.

In an example of the first graph, the values of the vertical axis do not decrease as the values of the horizontal axis increase.

An example of the first graph sequentially includes a section where the values of the vertical axis are uniform even when the values of the horizontal axis increase, and a section where the values of the vertical axis increase as the values of the horizontal axis increase.

In an example of the second graph, the values of the vertical axis do not decrease as the values of the horizontal axis increase.

An example of the second graph sequentially includes a section wherein the values of the vertical axis are uniform even when the values of the horizontal axis increase, and a section where the values of the vertical axis increase as the values of the horizontal axis increase.

In an example of the second graph, the values of the vertical axis do not increase as the values of the horizontal axis increase.

An example of the second graph sequentially includes a section where the values of the vertical axis decrease as the values of the horizontal axis increase, and a section where the values of the vertical axis are uniform even when the values of the horizontal axis increase.

An example of part (c) of the above-described method uses MPEG or H.264 technology.

According to another embodiment of the present invention, a recording medium is provided having recorded thereon a program for executing the method described previously.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EMBODIMENTS

Exemplary embodiments of the present invention will now be described in detail with reference to the attached drawings.

Figure 1:
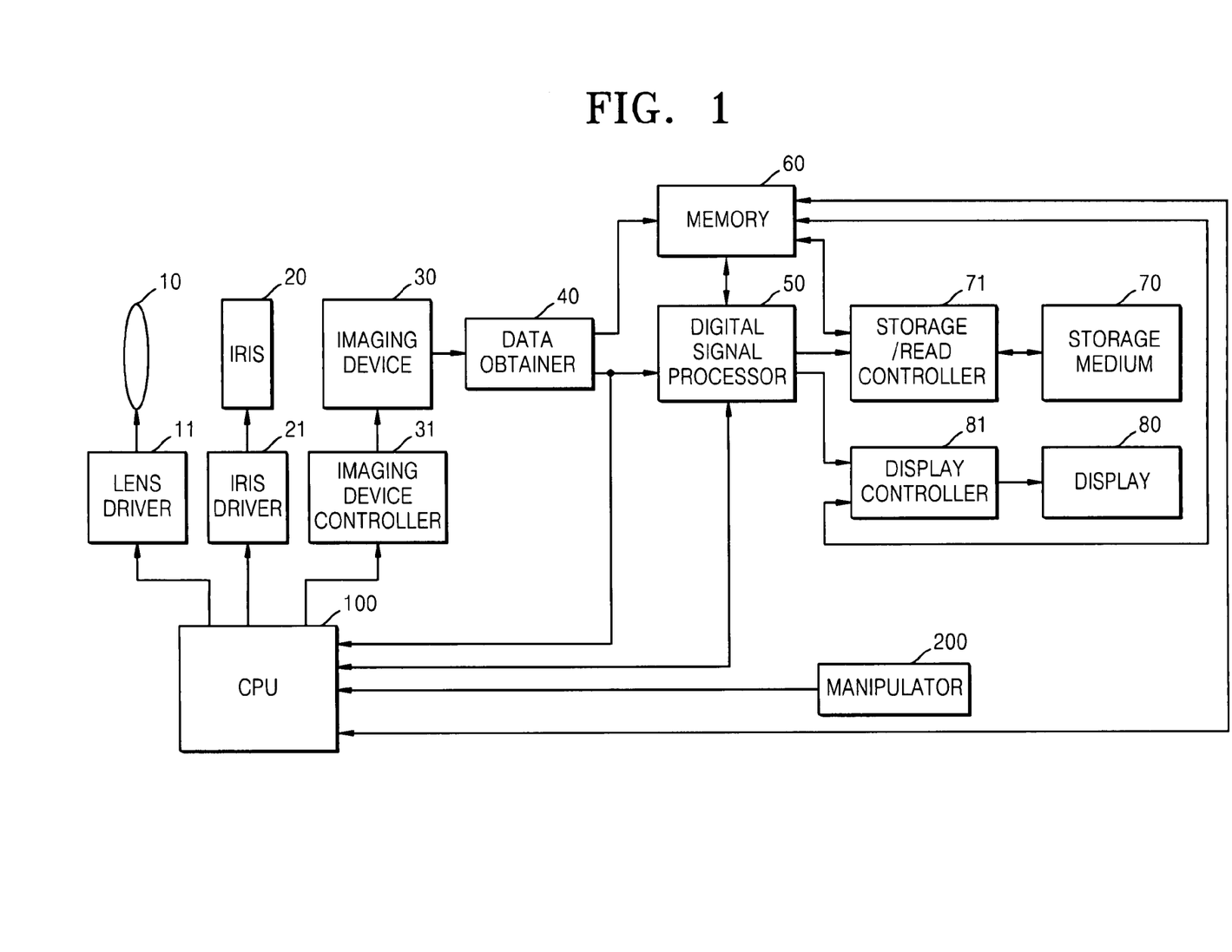
FIG. 1 is a block diagram illustrating an example of a digital photographing apparatus according to an embodiment of the present invention.
Figure 2:
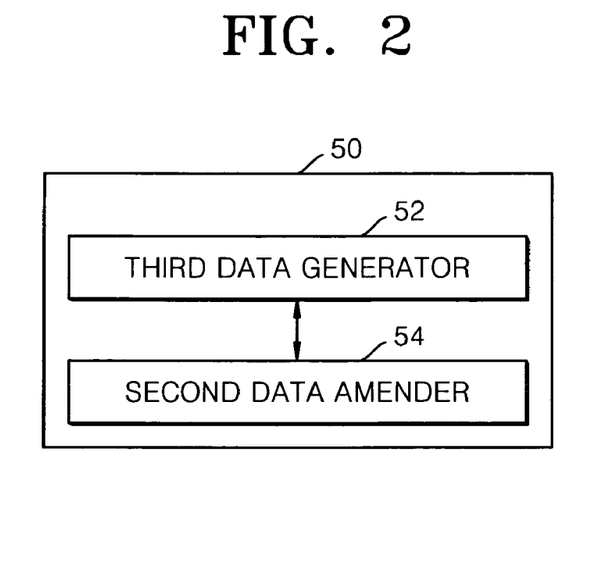
FIG. 2 is a block diagram illustrating an example of a part of the digital photographing apparatus of FIG. 1.

FIG. 1 is a block diagram illustrating an example of a digital photographing apparatus according to an embodiment of the present invention, and FIG. 2 is a block diagram illustrating an example of a part of the digital photographing apparatus of FIG. 1.

Operations of the digital photographing apparatus are controlled by a central processing unit (CPU) 100. Also, the digital photographing apparatus includes a manipulator 200, which includes a key that generates an electric signal from a user. The electric signal from the manipulator 200 is transmitted to the CPU 100, and the CPU 100 controls the digital photographing apparatus according to the electric signal.

In the case of a photographing mode, when the electric signal is applied to the CPU 100, the CPU 100 controls a lens driver 11, an iris driver 21, and an imaging device controller 31 according to the electric signal. Accordingly, the location of a lens 10, the opening of the iris 20, and sensitivity of an imaging device 30 are controlled. The imaging device 30 generates data about an image by using inputted light, and a data obtainer 40 obtains the data generated by the imaging device 30. In detail, the data obtainer 40 obtains first data about a first image of a subject through long exposure and second data about a second image of the subject through short exposure. This will be described later. The data obtainer 40 may be an analog/digital converter (ADC) or may include an ADC. According to characteristics of the imaging device 30, an ADC may not be required. The data obtainer 40 may be a part of a digital signal processor 50 that will be described later. Meanwhile, since the lens 10, the iris 20, and the imaging device 30 generate data about an image, various modifications to the data obtainer 40 are possible. For example, at least one of the lens 10, the iris 20, and the imaging device 30 may be a data obtainer, instead of being a separate element as illustrated in FIG. 1. Hereinafter, the data obtainer 40 denotes an element that generates or obtains data about an image of a photographed subject.

The data obtained by the data obtainer 40 may be inputted to the digital signal processor 50 through a memory 60 or directly (i.e., not through the memory 60), and if required, the data may be inputted to the CPU 100. Here, the memory 60 is a concept including a read only memory (ROM) or a random access memory (RAM). As occasion demands, the digital signal processor 50 may process a digital signal by performing, for example, gamma compensation, white balance adjustment, or the like. Also, as illustrated in FIG. 2, examples of the digital signal processor 50 may include other elements, such as a third data generator 52 and a second data amender 54. Here, various modifications may be made to the third data generator 52 and the second data amender 54, such as being made separate elements instead of internal elements of the digital signal processor 50. In other words, the digital photographing apparatus according to the current embodiment of the present invention is qualified as long as the third data generator 52 and the second data amender 54 are included. For convenience, a case where the third data generator 52 and the second data amender 54 are elements of the digital signal processor 50 is described. Operations of the third data generator 52 and the second data amender 54 are described later.

Image data outputted from the digital signal processor 50 is transmitted to a display controller 81 directly or through the memory 60. The display controller 81 controls a display 80 in order to display an image on the display 80. Also, the image data outputted from the digital signal processor 50 is inputted to a storage/read controller 71 directly or through the memory 60. The storage/read controller 71 stores the image data in a storage medium 70 automatically or according to a signal from a user. The storage/read controller 71 may read data about an image from an image file stored in the storage medium 70, and display an image on the display 80 by inputting the data about an image to the display controller 81 through the memory 60 or via another path. The storage medium 70 may be removable or permanently installed in the digital photographing apparatus.

Figure 3A:
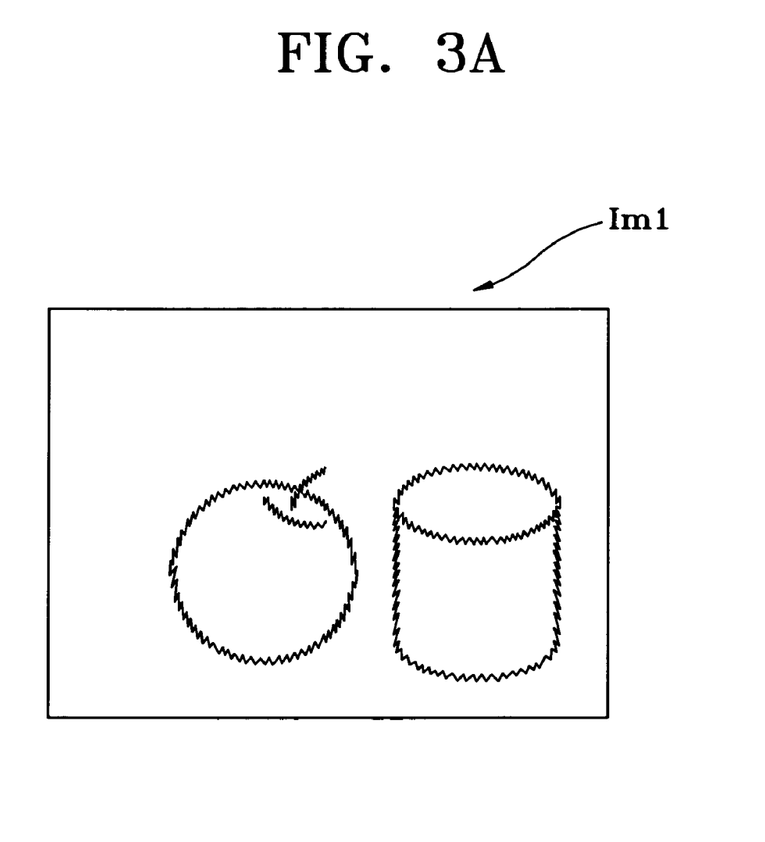
FIG. 3A is a conceptual diagram illustrating an example of a first image of a subject obtained by the digital photographing apparatus of FIG. 1 through long exposure.
Figure 3B:
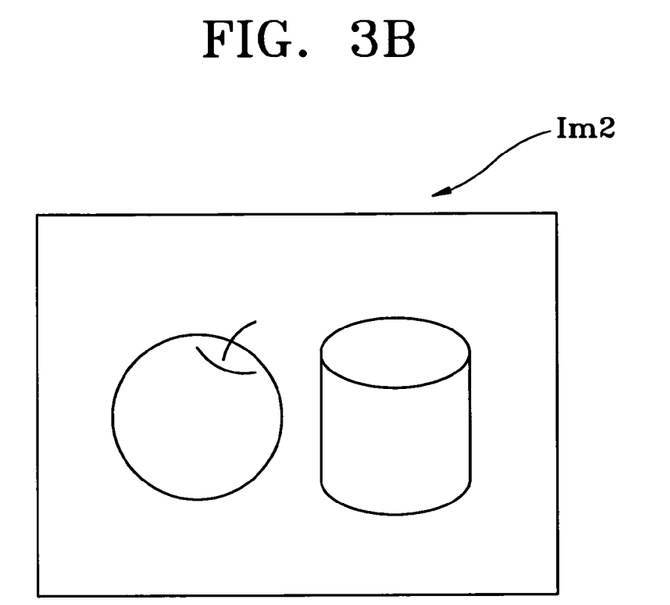
FIG. 3B is a conceptual diagram illustrating an example of a second image of a subject obtained by the digital photographing apparatus of FIG. 1 through short exposure.
Figure 3C:
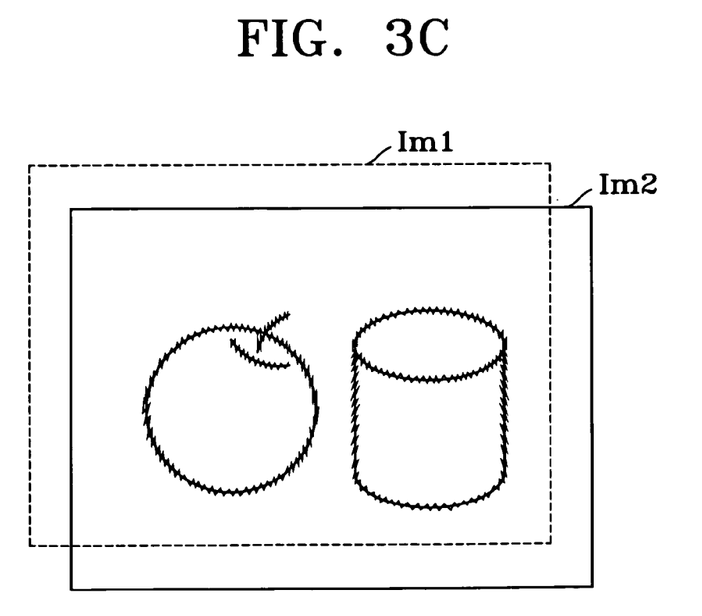
FIG. 3C is a conceptual diagram illustrating an example of a process of amending warping data about the first image so as to match the subject of the first image and the subject of the second image.
Figure 3D:
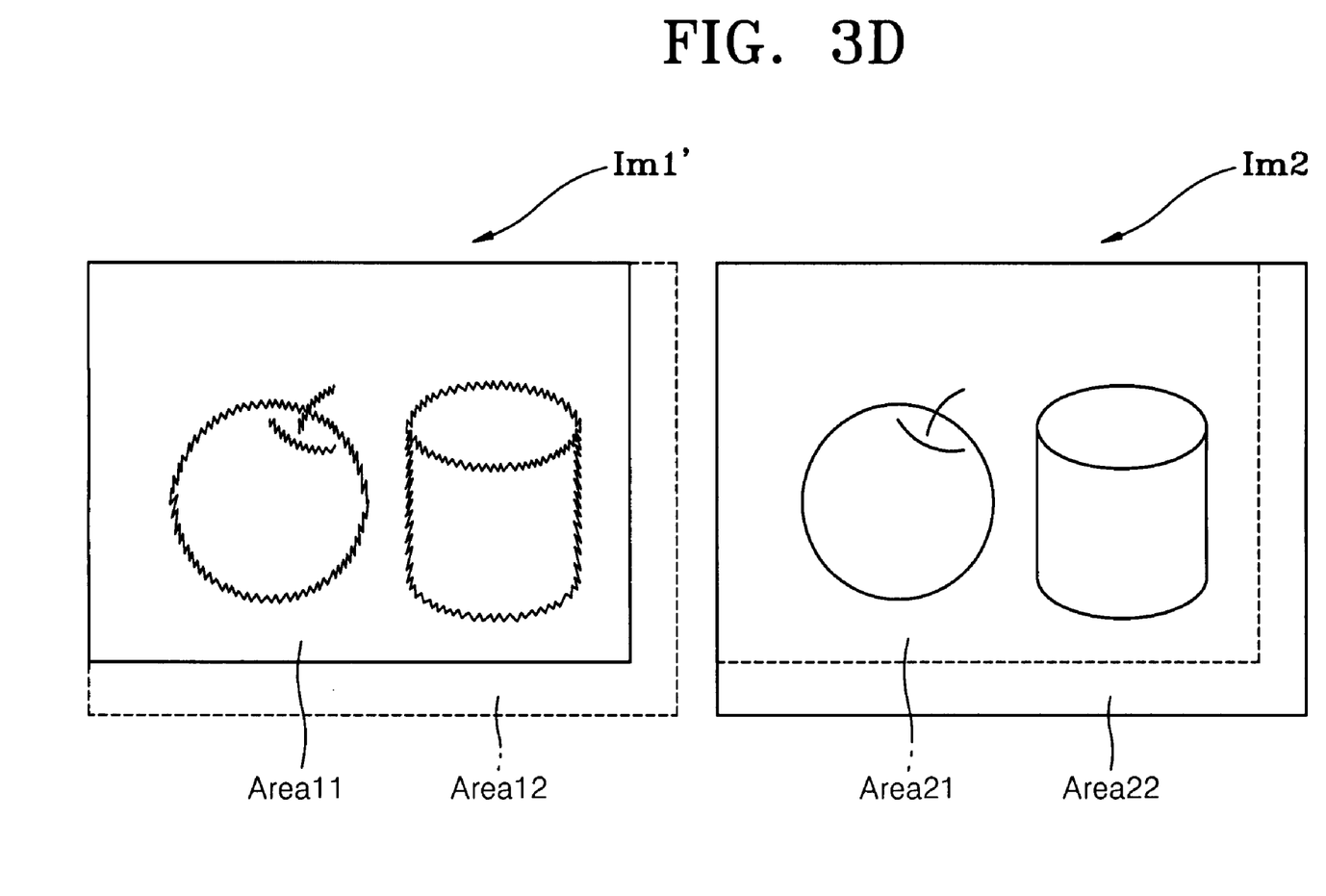
FIG. 3D is a conceptual diagram illustrating an example of a relationship between a third image, i.e., the amended first image, and the second image.
Figure 3E:
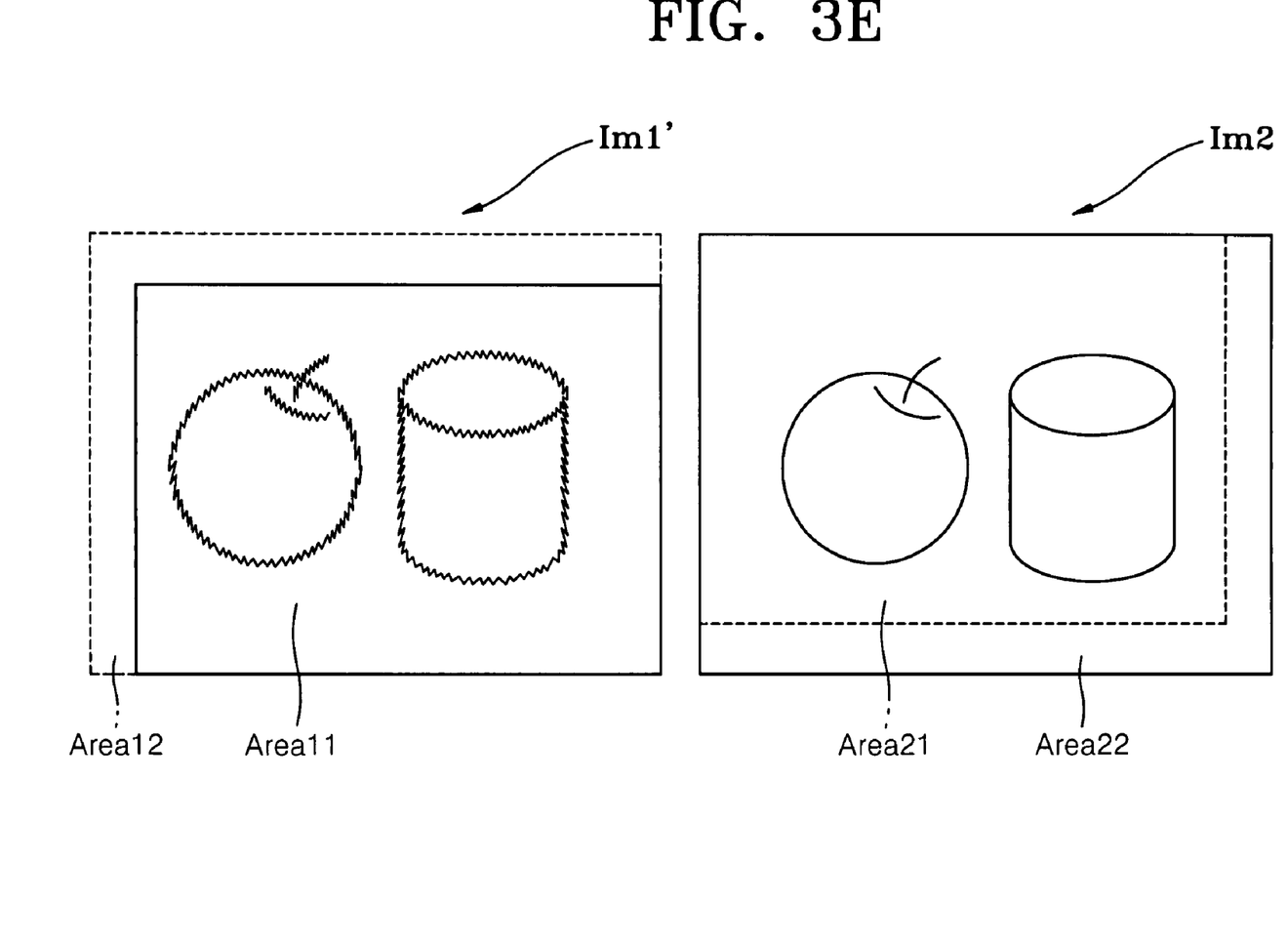
FIG. 3E is a conceptual diagram illustrating an example of another relationship between the third image, i.e., the amended first image, and the second image.

FIG. 3A is a conceptual diagram illustrating an example of a first image Im1 of a subject obtained by the digital photographing apparatus of FIG. 1 through long exposure. FIG. 3B is a conceptual diagram illustrating an example of a second image Im2 of the subject obtained by the digital photographing apparatus of FIG. 1 through short exposure. FIG. 3C is a conceptual diagram illustrating an example of a process of amending warping data about the first image Im1 so as to match the subject of the first image Im1 and the subject of the second image Im2. FIG. 3D is a conceptual diagram illustrating an example of a relationship between a third image Im1', i.e., the amended first image, and the second image Im2. FIG. 3E is a conceptual diagram illustrating another example of a relationship between the third image Im1', i.e., the amended first image, and the second image Im2. Examples of operations of the digital photographing apparatus of FIG. 1 will now be described with reference to FIGS. 3A through 3E.

When a photographing signal is received from a user in a photographing mode, the data obtainer 40 obtains first data about the first image Im1 of the subject as illustrated in FIG. 3A through long exposure, and obtains second data about the second image Im2 of the subject as illustrated in FIG. 3B through short exposure. An order of obtaining the first and second data may vary, for example, the first data may be obtained after obtaining the second data.

When the first data is obtained through long exposure, the digital photographing apparatus may shake while the imaging device 30 of the digital photographing apparatus is exposed to light since a shutter speed is low, and thus the resolution of the first image Im1 may significantly deteriorate as illustrated in FIG. 3A. Specifically, under low ambient light conditions, in order to obtain the first image Im1 with appropriate brightness, the shutter speed has to be low, and thus the resolution of the first image Im1 significantly deteriorates.

When the second data is obtained through short exposure, the imaging device 30 is exposed to the light only for a short time since the shutter speed is high, and thus the second image Im2, which is relatively clear, is obtained as illustrated in FIG. 3B. However, since the shutter speed is high, the sensitivity of the imaging device 30 should be increased in order to obtain the second image Im2 with appropriate brightness. Accordingly, the second image Im2 may have more noise than the first image Im1. If the sensitivity of the imaging device 30 is not increased in order to prevent noise while obtaining the second data about the second image Im2, the second image Im2 may be clear but relatively dark, since the imaging device 30 is exposed to light for only a short time as the shutter speed is high.

The third data generator 52 generates third data about the third image Im1' by warping the first data about the first image Im1 obtained by the data obtainer 40. In detail, as illustrated in FIG. 3C, the data obtainer 40 generates the third data about the third image Im1' by warping the first data about the first image Im1 obtained by the data obtainer 40, so that the subject of the first image Im1 and the subject of the second image Im2 match each other as illustrated in FIG. 3C. The first data is warped since the location of the subject in the first image Im1 and the location of the subject in the second image Im2 may differ because the digital photographing apparatus shakes while obtaining the first data and the second data.

FIG. 3D is a conceptual diagram illustrating an example of a relationship between the third image Im1', i.e., the amended first image, and the second image Im2. As illustrated in FIG. 3D, the third image Im1' is an amended image of the first image Im1, and corresponds to an overlapping area of the first and second images Im1 and Im2. Also, a pixel (x, y) of the third image Im1' corresponds to a pixel (x, y) of the second image Im2. In other words, pixel (1, 1) of the third image Im1' corresponds to pixel (1, 1) of the second image Im2. Accordingly, the third image Im1' is an area indicated by Area11, which corresponds to an area indicated by Area21 of the second image Im2. Area12 in FIG. 3D does not denote an area that belongs to the third image Im1', but is conceptually illustrated to show that the third image Im1' does not have an area that corresponds to Area22 of the second image Im2. However, various modifications may be made, like making the size of the third image Im1' being equal to the size of the second image Im2, and making the area corresponding to Area 22 of the second image Im2 be in the third image Im1' as occasion demands. Also, a relationship between the third image Im1' and the second image Im2 may be different from the relationship illustrated in FIG. 3D, for example, the third image Im1' may not have the pixel (1, 1) as illustrated in FIG. 3E, and the relationship is not limited thereto. For convenience of description, the third image Im1' has the relationship illustrated in FIG. 3D.

The third data generator 52 may use MPEG or H.264 technology. The MPEG or H.264 technology is technology related to moving image compression. In moving image compression, processes of determining an image matching between one frame and another frame, or processes of dividing a frame into small areas, dividing another frame into small frames, and determining whether the small areas of the frame are matched to corresponding small areas of the other frame are performed. Accordingly, since the MPEG or H.264 technology includes the above processes, the third data generator 52 can use such MPEG or H.264 technology, for example.

The second data amender 54 amends the second data about the second image Im2 by using the third data about the third image Im1'. In detail, when a third data value at a pixel (x, y) of the third image Im1' according to the third data is W(x, y) and a second data value at a pixel (x, y) of the second image Im2 according to the second data is S(x, y), it is determined whether |W(x, y)−S(x, y)| or a value obtained by processing |W(x, y)−S(x, y)| with regard to the pixel (x, y) of the second image Im2 satisfies a predetermined condition. If |W(x, y)−S (x, y)| or the value obtained by processing |W(x, y)−S(x, y)| satisfies the predetermined condition, the second data is amended so that the second data value S(x, y) has the third data value W(x, y). If |W(x, y)−S(x, y)| or the value obtained by processing |W(x, y)−S(x, y)| does not satisfy the predetermined condition, the second data value S(x, y) is not amended.

Here, as described above, the third image Im1' may correspond to the overlapping area of the first image Im1 and the second image Im2. In this case, the second data amender 54 determines whether the second data is amended in each pixel (x, y) of the second image Im2 only when the third data value W(x, y) at the corresponding pixel (x, y) of the third image Im1' according to the third data exits.

As described above, the second image Im2 of the subject obtained through short exposure is relatively clear compared to the first image Im1 or the third image Im1', but the second image Im2 may have more noise or be relatively dark. Accordingly, data about the second image Im2 can be amended by using the first image Im1, which is not clearer than the second image Im2 but has less noise than the second image Im2 or is brighter than the second image Im2, in order to obtain the final image which is clear and has less noise or is brighter. The second data about the second image Im2 amended by the second data amender 54 can be stored in the storage medium that is installed or removably attached to in the digital photographing apparatus.

The second data amender 54 can amend the second data by using the second data and the third data after the third data generator 52 completes generating the third data, but it is not limited thereto and while the third data generator 52 generates the third data, the second data amender 54 can amend the second data by using the second data and the third data that is being generated.

The predetermined condition of amending the second data by using the second data amender 54 will now be described.

Figure 4:
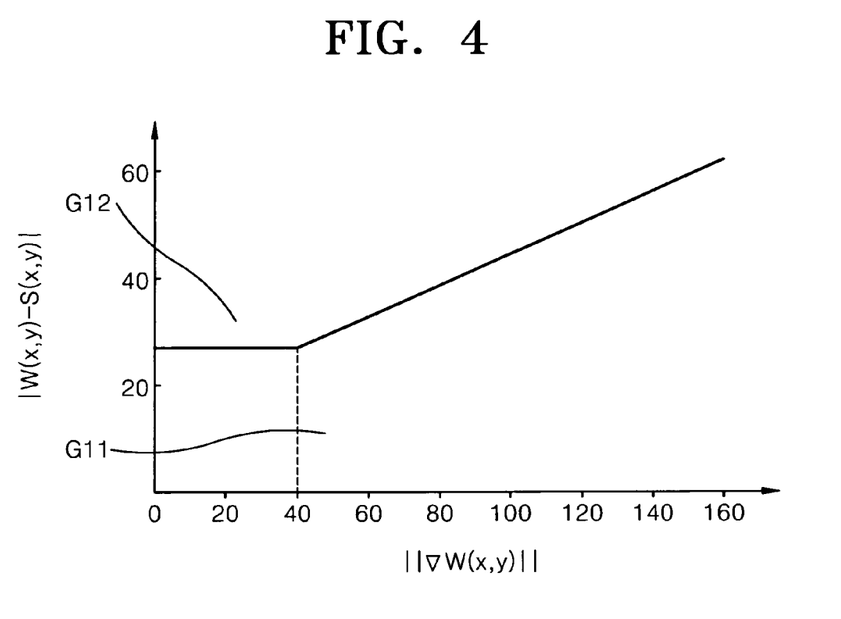
FIG. 4 illustrates an example of a first graph used by the digital photographing apparatus of FIG. 1 to determine whether data about a second image is to be amended according to an embodiment of the present invention.
Figure 5A:
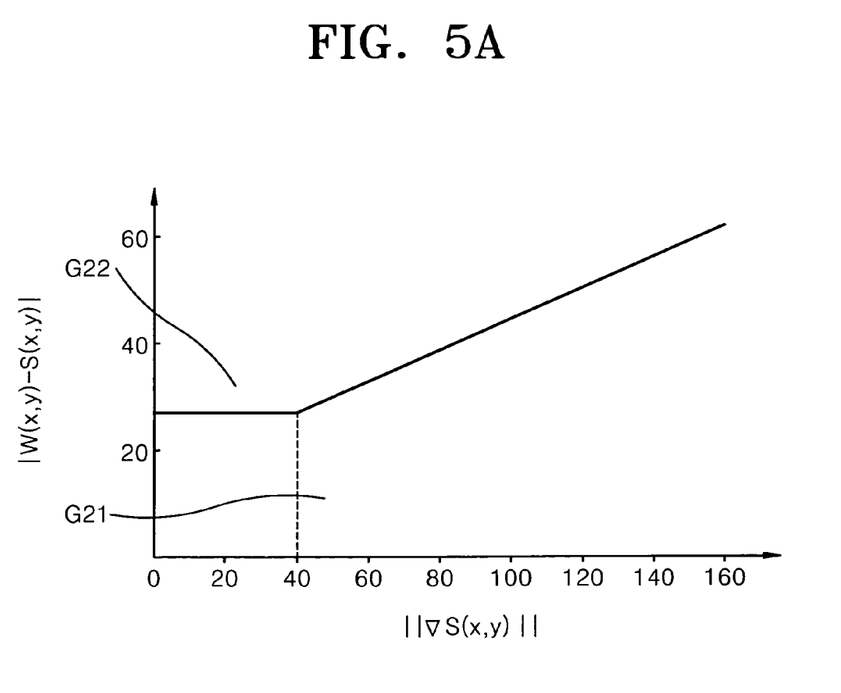
FIG. 5A illustrates an example of a second graph used by the digital photographing apparatus of FIG. 1 to determine whether data about a second image is to be amended according to an embodiment of the present invention.

FIG. 4 illustrates an example of a first graph used by the digital photographing apparatus of FIG. 1 to determine whether the second data about the second image Im2 is to be amended according to an embodiment of the present invention, and FIG. 5A illustrates a second graph used by the digital photographing apparatus of FIG. 1 to determine whether the second data about the second image Im2 is to be amended according to an embodiment of the present invention. When the third data value at a pixel (x, y) of the third image Im1' according to the third data is W(x, y) and the second data value at a pixel (x, y) of the second image Im2 according to the second data is S(x, y), the horizontal axis of the coordinate system FIG. 4 is a gradient norm of W(x, y), i.e. $\|\nabla W(x,y)\|$ and the vertical axis of the coordinate system of FIG. 4 is |W(x, y)−S(x, y)|. $\|\nabla W(x, y)\|$ denotes $$\sqrt{\left(\frac{\partial W(x, y)}{\partial x}\right)^2 + \left(\frac{\partial W(x, y)}{\partial y}\right)^2},$$

and |W(x, y)−S(x, y)| denotes a difference between W(x, y) and S(x, y). Alternatively in FIG. 4, the horizontal axis may be a value obtained by processing (such as squaring) a gradient norm of W(x, y), and the vertical axis may be a value obtained by processing |W(x, y)−S(x, y)|. Accordingly, various modifications may be made to the coordinate system of FIG. 4. The horizontal axis of the coordinate system of FIG. 5A is a gradient norm of S(x, y), i.e. $\|\nabla S(x, y)\|$ and the vertical axis of the coordinate system of FIG. 5A is |W(x, y)−S(x, y)|. Here, $\|\nabla S(x, y)\|$ denotes $$\sqrt{\left(\frac{\partial S(x, y)}{\partial x}\right)^2 + \left(\frac{\partial S(x, y)}{\partial y}\right)^2}.$$

Alternatively in the example shown in FIG. 5A, the horizontal axis may be a value obtained by processing (such as squaring) a gradient norm of S(x, y), and the vertical axis may be a value obtained by processing |W(x, y)−S(x, y)|. Accordingly, various modifications may be made to the coordinate system of FIG. 5A. For convenience of description, the coordinate system of FIGS. 4 and 5A is described. In FIGS. 4 and 5A, the vertical axis is |W(x, y)−S(x, y)|, and so in the case of 8-bit image information, W(x, y) and S(x, y) may have a value between 0 to 255 (where $255=2^6-1$), and the vertical axis may also have a value between 0 to 255.

Referring to the first graph of FIG. 4, the values of the vertical axis do not decrease as the values of the horizontal axis increase, and specifically, the first graph sequentially includes a section where the values of the vertical axis are uniform even when the values of the horizontal axis increase and a section where the values of the vertical axis increase as the values of the horizontal axis increase. Referring to the second graph of FIG. 5A, the values of the vertical axis do not decrease as the values of the horizontal axis increase, and specifically, the second graph sequentially includes a section where the values of the vertical axis are uniform even when the values of the horizontal axis increase and a section where the values of the vertical axis increase as the values of the horizontal axis increase. This will be described in detail later.

In such a coordinate system and the first and second graphs, when a value of |W(x, y)−S(x, y)| with regard to a pixel (x, y) of the second image Im2 and a corresponding pixel (x, y) of the third image Im1' is in a preset bottom area G11 of the first graph illustrated in FIG. 4 and in a preset bottom area G21 of the second graph illustrated in FIG. 5A, the second data amender 54 determines that the value of |W(x, y)−S(x, y)| satisfies a predetermined condition for amending the second data, and thus amends the second data so that the second data value S(x, y) at the pixel (x, y) of the second image Im2 is equal to the third data value W(x, y) at the pixel (x, y) of the third image Im1'. When the value of |W(x, y)−S(x, y)| with regard to the pixel (x, y) of the second image Im2 and the corresponding pixel (x, y) of the third image Im1' is in a preset top area G12 of the first graph illustrated in FIG. 4 and in a preset top area G22 of the second graph illustrated in FIG. 5A, the second data amender 54 determines that the value of |W(x, y)−S(x, y)| does not satisfy the predetermined condition, and thus does not amend the second data.

The first graph of FIG. 4 will now be described. The horizontal axis is a gradient norm of W(x, y), which denotes the extent to which the third data value W(x, y) changes in the vicinity of the pixel (x, y) of the third image Im1'. When the extent to which the third data value W(x, y) changes is large, it can be understood that the corresponding pixel (x, y) is in a boundary area of the subject with regard to the third image Im1'. This is because a data value generally changes significantly near the boundary of a subject. Accordingly, when a point is calculated based on the third data value W(x, y) and the second data value S(x, y) at the pixel (x, y) and the point is displayed on the coordinate system of FIG. 4, as the location of the point leans to the right, it is understood that the corresponding pixel (x, y) is in the boundary area of the subject with regard to the third image Im1'.

However, since an image obtained through long exposure generally has low resolution, the boundary of a subject of the obtained image is not clear. Accordingly in such an image, when it is determined that a pixel (x, y) is in a boundary area of the subject, it is likely that the pixel (x, y) is also in a boundary area of the subject in a clear image obtained through short exposure. The third image Im1' is obtained from the first image Im1, and the first image Im1 is obtained through long exposure. Accordingly, a pixel (x, y) that is determined to be in the boundary area of the subject of the third image Im1' is likely to be in the boundary area of the subject of the second image Im2. This shows that the pixel (x, y) of the third image Im1' is likely to exactly correspond to the corresponding pixel (x, y) of the second image Im2, and thus it is considered that a first condition, where a data value at the pixel (x, y) of the second image Im2 has a data value at the corresponding pixel (x, y) of the third image Im1', is satisfied. When it is likely that the pixel (x, y) of the third image Im1' exactly corresponds to the pixel (x, y) of the second image Im2, it is preferable to use information about the third image Im1' that has less noise and is brighter.

Meanwhile, when the location of the point, which is calculated based on the third data value W(x, y) and the second data value S(x, y) at the (x, y) pixel, leans to the left, it is understood that the pixel (x, y) is not in the boundary area of the subject of the third image Im1'. Accordingly in this case, it is likely that the pixel (x, y) of the third image Im1' and the pixel (x, y) of the second image Im2 do not mutually match each other. Consequently, the second data amender 54 may amend the second data value to have the third data value only when the value of |W(x, y)−S(x, y)| is small.

By arranging the first graph to have the form as illustrated in FIG. 4, a tendency of the second data amender 54 amending the second data is increased even when a difference between the third data value W(x, y) and the second data value S(x, y) increases as the probability of the pixel (x, y) of the third image Im1' corresponding to the boundary of the subject increases, i.e. as the value of the horizontal axis increases. In other words, the first graph is arranged in such a way that the values of the vertical axis do not decrease as the values of the horizontal axis increase, and specifically, as illustrated in FIG. 4, the first graph is arranged to sequentially include a section where the values of the vertical axis are uniform even when the values of the horizontal axis increase and a section where the values of the vertical axis increase as the values of the horizontal axis increase.

Meanwhile in FIG. 4, a point where the graph and the vertical axis meet can be set up in various ways. |W(x, y)−S(x, y)| of the vertical axis roughly means a difference between W(x, y) and S(x, y), and a condition of the first graph of FIG. 4 is a condition for removing noise. If an overlapping area of the second image Im2 and the third image Im1' is exactly the same, |W(x, y)−S(x, y)| has a value calculated according to noise of the second image Im2 and noise of the third image Im1'. Consequently, when the standard deviation of noises in a plurality of images obtained by using the digital photographing apparatus is σ and when the overlapping area of the second image Im2 and the third image Im1' is exactly the same, |W(x, y)−S(x, y)| is 2σ. Accordingly, the value of the point where the graph and the vertical axis meet is 2σ.

The second graph illustrated in FIG. 5A will now be described. Unlike FIG. 4, the horizontal axis of the second graph is a gradient norm of S(x, y), which denotes the extent to which the second data value S(x, y) changes at the vicinity of the pixel (x, y) of the second image Im2. Accordingly, when a point is calculated from the third data value W(x, y) and the second data value S(x, y) at the pixel (x, y) and displayed on the coordinate system of FIG. 5A, as the location of the point leans to the right, it can be understood that the pixel (x, y) is in the boundary area of the subject of the second image Im2.

Consequently, while the first graph of FIG. 4 increases the probability of the second data amender 54 amending the second data of the second image Im2 to have the third data of the third image Im1' when the pixel (x, y) is in the boundary area of the third image Im1', the second graph of FIG. 5A increases the probability of the second data amender 54 amending the second data of the second image Im2 to have the third data of the third image Im1' when the pixel (x, y) is in the boundary area of the second image Im2. In other words, when the point corresponding to the pixel (x, y) is in the bottom area G21 of the second graph, it is considered that a second condition, where a data value at the pixel (x, y) of the second image Im2 has a data value at the corresponding pixel (x, y) of the third image Im1', is satisfied.

As described above, when the first and second conditions as illustrated in FIGS. 4 and 5A are both satisfied, the second data amender 54 determines that the predetermined condition of amending the second data is satisfied, and thus amends the second data so that the second data value S(x, y) at the pixel (x, y) of the second image Im2 has the third data value W(x, y) at the pixel (x, y) of the third image Im1'. Consequently, the second data amender 54 amends the second data according to the third data only when a pixel of the third image Im1' exactly matches a corresponding pixel of the second image Im2 by cross checking the second image Im2 and the third image Im1'. Accordingly, a final image which is clear, has less noise, and is brighter, can be obtained.

Figure 5B:
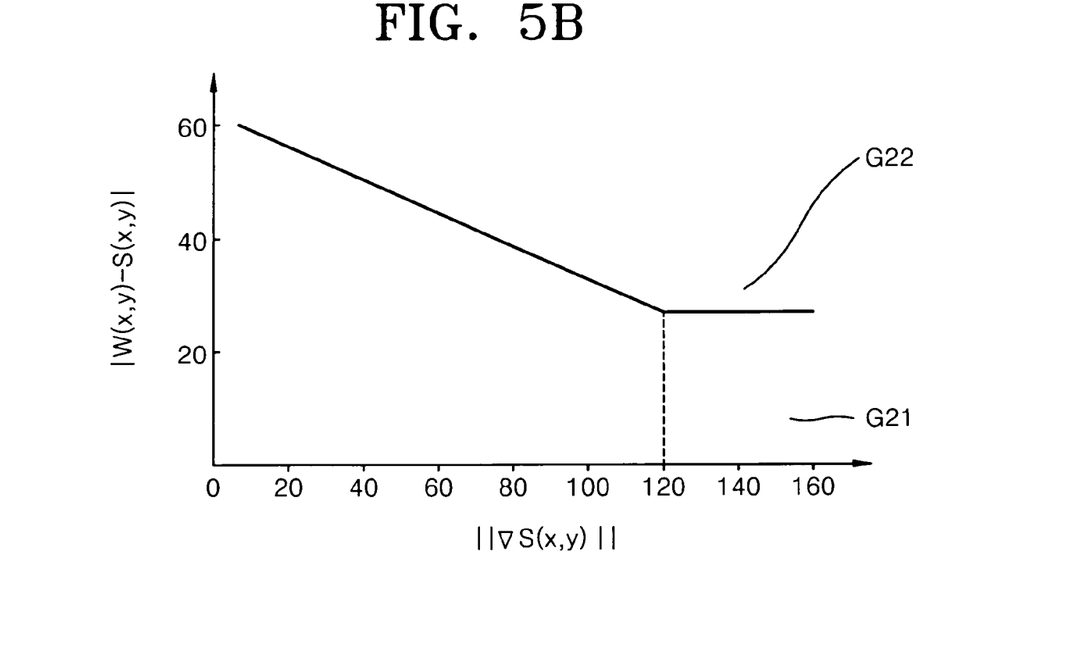
FIG. 5B illustrates in brief an example of the second graph used by the digital photographing apparatus of FIG. 1 to determine whether data about a second image is to be amended according to another embodiment of the present invention.

If required, a second graph as illustrated in FIG. 5B may be used. The second graph of FIG. 5B is a graph where values of the vertical axis do not increase as values of the horizontal axis increase. Specifically, the second graph of FIG. 5B includes a section where the values of the vertical axis decrease as the values of the horizontal axis increase and a section where the values of the vertical axis are uniform even when the values of the horizontal axis increase. In other words, in the second graph of FIG. 5B, the second data amender 54 amends the second data only when a pixel (x, y) that is determined to be in the boundary area of the clear second image Im2 satisfies a strict condition, i.e. only when a difference between the third data value W(x, y) at the pixel (x, y) and the second data value S(x, y) at the pixel (x, y) is small. This means that the second data about the boundary area of the second image Im2 is not amended, but only the second data about an area excluding the boundary area is amended according to the third data so as to obtain the final image that is clear, has less noise, and is brighter. In other words, the resolution of the final image obtained by using the second graph of FIG. 5B is higher than the resolution of the final image obtained by using the second graph of FIG. 5A. Accordingly, a user may choose from the second graph of FIG. 5A and the second graph illustrated in FIG. 5B as occasion demands. In FIG. 5B, the value of the vertical axis in the section where the values of the vertical axis are uniform even when the values of the horizontal axis increase is 2σ as described with reference to FIG. 4, considering that the standard deviation of noises in a plurality of images obtained by using the digital photographing apparatus is σ.

Figure 5C:
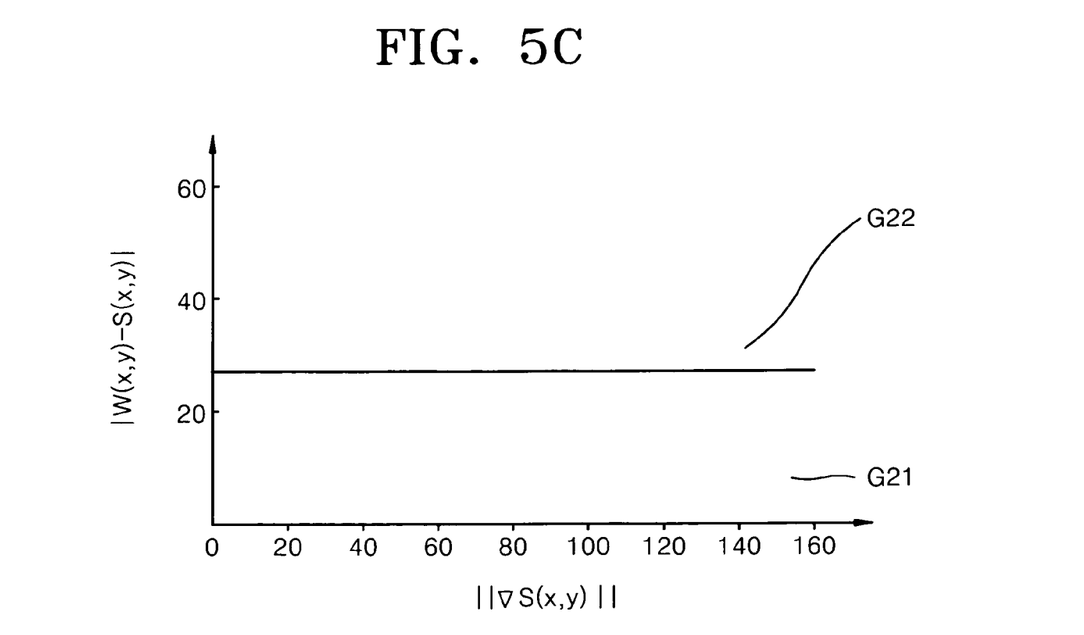
FIG. 5C illustrates an example of the second graph used by the digital photographing apparatus of FIG. 1 to determine whether data about a second image is to be amended according to another embodiment of the present invention.

As occasion demands, the second graph illustrated in FIG. 5C may be used. In the second graph illustrated in FIG. 5C, the values of the vertical axis are uniform regardless of the values of the horizontal axis. In FIG. 5C, the value of the vertical axis is 2σ as described with reference to FIG. 4, considering that the standard deviation of noises in a plurality of images obtained by using the digital photographing apparatus is σ.

Meanwhile, the second data value S(x, y) at the pixel (x, y) of the second image Im2 and the third data value W(x, y) at the pixel (x, y) of the third image Im1' may be one of RGB color data, YCbCr data, and YUV data. In the case of RGB color data, each of S(x, y) and W(x, y) may have three data values, i.e. data about R, data about G, and data about B. In the case of YCbCr data, each of S(x, y) and W(x, y) may also have three data values, i.e. data about Y, data about Cb and data about Cr, and in the case of YUV, each of S(x, y) and W(x, y) may also have three data values, i.e. data about Y, data about U and data about V. Accordingly as described above, the second data amender 54 may determine whether to amend the second data when one data value from among the three data values of each of S(x, y) and W(x, y) satisfies the predetermined condition or when all data values of S(x, y) and W(x, y) satisfy the predetermined condition.

Figure 6:
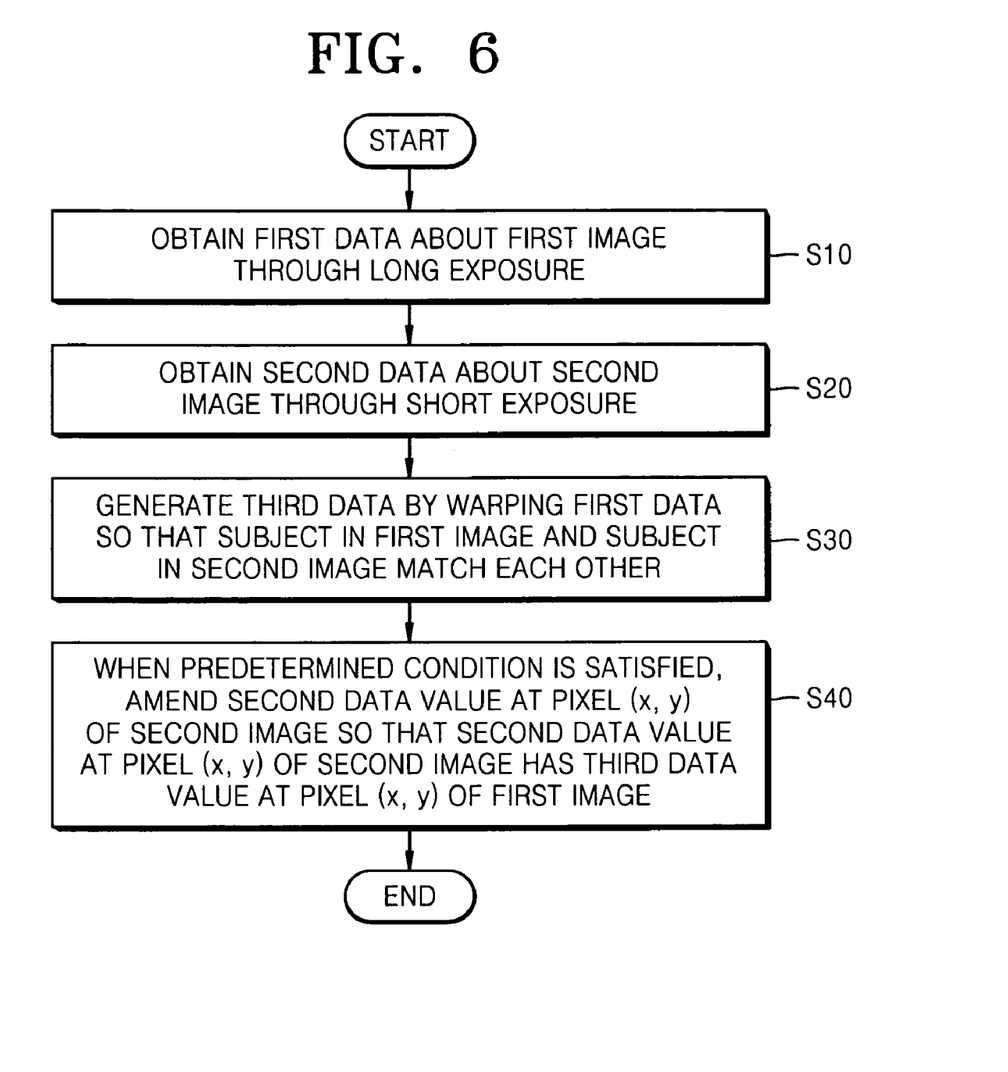
FIG. 6 is a flowchart illustrating an example of a method of controlling a digital photographing apparatus according to an embodiment of the present invention.

FIG. 6 is a flowchart illustrating an example of a method of controlling a digital photographing apparatus according to an embodiment of the present invention.

Referring to FIG. 6, first data about a first image of a subject is obtained through long exposure in operation S10, and second data about a second image of the subject is obtained through short exposure in operation S20. The order of performing operations S10 and S20 may change, and if required, operations S10 and S20 may be performed simultaneously.

After obtaining the first and second data, third data about a third image is generated in operation S30 by warping the first data so that the subject in the first image and the subject in the second image are matched together. Operation S30 may be MPEG or H.264 technology, for example, which has already been described above.

After operation S30, when a third data value at a pixel (x, y) of the third image is W(x, y), a second data value at a pixel (x, y) of the second image is S(x, y), and |W(x, y)−S(x, y)| or a value obtained by processing |W(x, y)−S(x, y)| satisfies a predetermined condition with regard to the pixel (x, y) of the second image, the second data value S(x, y) at the pixel (x, y) of the second image is amended in operation S40 so that the second data value S(x, y) has the third data value W(x, y). If |W(x, y)−S(x, y)| or a value obtained by processing |W(x, y)−S(x, y)| does not satisfy the predetermined condition, the second data value S(x, y) is not amended.

Operation S40 may be performed after operation S30 is completed, but various modifications may be made, such as generating the third data while determining and amending the second data value by using the second data and the third data that is being generated.

As described above, the second image obtained through short exposure is a clear image and the first image obtained through long exposure is a brighter image with less noise. Accordingly, the third image corresponding to the third data generated from the first image is a bright image with less noise. By amending the second image under a predetermined condition by using such a third image, a clear and bright final image with less noise can be obtained. The method may further include storing the amended second data of the second image in a storage medium as final data.

As described with reference to FIGS. 1 through 5B, operation 40 is performed at each pixel (x, y) of the second image only when the third data value W(x, y) at a corresponding pixel (x, y) of the third image exits. In other words, operation S40 is performed only in an overlapping area of the second image and the third image (or the first image). When there is no third image corresponding to an area of the second image, the second data in the corresponding area of the second image is not amended.

The predetermined condition of operation 40 is described above with reference to FIGS. 4, 5A and 5B.

A program for executing the method of controlling a digital photographing apparatus according to the embodiments and modified embodiments in the digital photographing apparatus can be stored in a recording medium. Here, the recording medium may be the storage medium 70 illustrated in FIG. 1, the memory 60 illustrated in FIG. 1, or a separate recording medium different from the storage medium 70 and the memory 60. Examples of the recording medium include magnetic storage media (for example, ROM, floppy disks, hard disks, and the like) and optical recording media (for example, CD-ROMs, or DVDs and the like). For example, the recording medium may be a part of the CPU 100 illustrated in FIG. 1.

By using the digital photographing apparatus, a method of controlling the digital photographing apparatus, and a recording medium having recorded thereon a program for executing the method of the present invention, a clear image can be obtained even when the digital photographing apparatus shakes while a photograph is being taken.

While the present invention has been particularly shown and described with reference to exemplary embodiments thereof, it will be understood by those having ordinary skill in the art that various changes in form and details may be made therein without departing from the spirit and scope of the present invention as defined by the following claims.

What is claimed is:

1. A digital photographing apparatus, comprising:
a data obtainer that obtains first data about a first image of a subject through long exposure, and second data about a second image of the subject through short exposure;
a third data generator that generates third data about a third image by warping the first data obtained by the data obtainer so that the subject of the first image according to the first data obtained by the data obtainer and the subject of the second image according to the second data obtained by the data obtainer are matched together; and
a second data amender which, when a third data value at a pixel (x, y) of the third image according to the third data generated by the third data generator is W(x, y) and a second data value at a pixel (x, y) of the second image according to the second data obtained by the data obtainer is S(x, y), and when |W(x, y)−S(x, y)| or a value obtained by processing |W(x, y)−S(x, y)| with regard to the pixel (x, y) of the second image satisfies a predetermined condition for amending the second data, amends the second data so that the second data value S(x, y) at the pixel (x, y) of the second image has the third data value W(x, y) at the pixel (x, y) of the third image, wherein the second data amender determines whether the second data is amended, at each pixel (x, y) of the second image according to the second data obtained by the data obtainer, only when the corresponding third data value W(x, y) at the pixel (x, y) of the third image according to the third data generated by the third data generator exists.

2. The digital photographing apparatus of claim 1, wherein the amended second data of the second image is stored in a storage medium as final data.

3. A digital photographing apparatus, comprising:

a data obtainer that obtains first data about a first image of a subject through long exposure, and second data about a second image of the subject through short exposure;

a third data generator that generates third data about a third image by warping the first data obtained by the data obtainer so that the subject of the first image according to the first data obtained by the data obtainer and the subject of the second image according to the second data obtained by the data obtainer are matched together; and a second data amender which, when a third data value at a pixel (x, y) of the third image according to the third data generated by the third data generator is W(x, y) and a second data value at a pixel (x, y) of the second image according to the second data obtained by the data obtainer is S(x, y), and when |W(x, y)−S(x, y)| or a value obtained by processing |W(x, y)−S(x, y)| with regard to the pixel (x, y) of the second image satisfies a predetermined condition for amending the second data, amends the second data so that the second data value S(x, y) at the pixel (x, y) of the second image has the third data value W(x, y) at the pixel (x, y) of the third image, wherein in the predetermined condition, the pixel (x, y) of the second image according to the second data obtained by the data obtainer is in a bottom area of a pre-set first graph when the pixel (x, y) of the second image is shown on a coordinate system in which a horizontal axis is a gradient norm of W(x, y) or a value obtained by processing a gradient norm of W(x, y) and a vertical axis is |W(x, y)−S(x, y)| or a value obtained by processing |W(x, y)−S(x, y)|, and the pixel (x, y) of the second image according to the second data obtained by the data obtainer is in a bottom area of a pre-set second graph when the pixel (x, y) of the second image is shown on a coordinate system in which a horizontal axis is a gradient norm of S(x, y) or a value obtained by processing a gradient norm of S(x, y) and a vertical axis is |W(x, y)−S(x, y)| or a value obtained by processing |W(x, y)−S(x, y)|.

4. The digital photographing apparatus of claim 3, wherein in the first graph, the values of the vertical axis do not decrease as the values of the horizontal axis increase.

5. The digital photographing apparatus of claim 4, wherein the first graph sequentially includes a section where the values of the vertical axis are uniform even when the values of the horizontal axis increase and a section where the values of the vertical axis increase as the values of the horizontal axis increase.

6. The digital photographing apparatus of claim 3, wherein in the second graph, the values of the vertical axis do not decrease as the values of the horizontal axis increase.

7. The digital photographing apparatus of claim 6, wherein the second graph sequentially includes a section where the values of the vertical axis are uniform even when the values of the horizontal axis increase and a section where the values of the vertical axis increase as the values of the horizontal axis increase.

8. The digital photographing apparatus of claim 3, wherein in the second graph, the values of the vertical axis do not increase as the values of the horizontal axis increase.

9. The digital photographing apparatus of claim 8, wherein the second graph sequentially includes a section where the values of the vertical axis decrease as the values of the horizontal axis increase, and a section where the values of the vertical axis are uniform even when the values of the horizontal axis increase.

10. The digital photographing apparatus of claim 1, wherein the third data generator uses moving image compression technology.

11. A method of controlling a digital photographing apparatus, the method comprising:

(a) obtaining first data about a first image of a subject through long exposure;

(b) obtaining second data about a second image of the subject through short exposure;

(c) generating third data about a third image by warping the first data about the first image so that the subject of the first image and the subject of the second image are matched together; and (d) when a third data value at a pixel (x, y) of the third image is W(x, y) and a second data value at a pixel (x, y) of the second image is S(x, y), and |W(x,y)−S(x,y)| or a value obtained by processing |W(x,y)−S(x,y)| with regard to the pixel (x, y) of the second image satisfies a predetermined condition, amending the second data value S(x, y) at the pixel (x, y) of the second image so that the second data value S(x, y) at the pixel (x, y) of the second image has the third data value W(x, y) at the pixel (x, y) of the third image, wherein (d) is performed in each pixel (x, y) of the second image only when the third data value W(x, y) at the corresponding pixel (x, y) of the third image exists.

12. The method of claim 11, further comprising (e) storing the second data of the second image amended in (d) in a storage medium as final data.

13. A method of controlling a digital photographing apparatus, the method comprising:

(a) obtaining first data about a first image of a subject through long exposure;

(b) obtaining second data about a second image of the subject through short exposure;

(c) generating third data about a third image by warping the first data about the first image so that the subject of the first image and the subject of the second image are matched together; and (d) when a third data value at a pixel (x, y) of the third image is W(x, y) and a second data value at a pixel (x, y) of the second image is S(x, y), and |W(x,y)−S(x,y)| or a value obtained by processing |W(x,y)−S(x,y)| with regard to the pixel (x, y) of the second image satisfies a predetermined condition, amending the second data value S(x, y) at the pixel (x, y) of the second image so that the second data value S(x, y) at the pixel (x, y) of the second image has the third data value W(x, y) at the pixel (x, y) of the third image, wherein in the predetermined condition, the pixel (x, y) of the second image is in a bottom area of a pre-set first graph when the pixel (x, y) of the second image is shown on a coordinate system in which a horizontal axis is a gradient norm of W(x, y) or a value obtained by processing a gradient norm of W(x, y) and a vertical axis is |W(x, y)−S(x, y)| or a value obtained by processing |W(x, y)−S(x, y)|, and the pixel (x, y) of the second image is in a bottom area of a pre-set second graph when the pixel (x, y) of the second image is shown on a coordinate system in which a horizontal axis is a gradient norm of S(x, y) or a value obtained by processing a gradient norm of S(x, y) and a vertical axis is |W(x, y)−S(x, y)| or a value obtained by processing |W(x, y)−S(x, y)|.

14. The method of claim 13, wherein in the first graph, the values of the vertical axis do not decrease as the values of the horizontal axis increase.

15. The method of claim 14, wherein the first graph sequentially includes a section where the values of the vertical axis are uniform even when the values of the horizontal axis increase, and a section where the values of the vertical axis increase as the values of the horizontal axis increase.

16. The method of claim 13, wherein in the second graph, the values of the vertical axis do not decrease as the values of the horizontal axis increase.

17. The method of claim 16, wherein the second graph sequentially includes a section wherein the values of the vertical axis are uniform even when the values of the horizontal axis increase, and a section where the values of the vertical axis increase as the values of the horizontal axis increase.

18. The method of claim 13, wherein in the second graph, the values of the vertical axis do not increase as the values of the horizontal axis increase.

19. The method of claim 18, wherein the second graph sequentially includes a section where the values of the vertical axis decrease as the values of the horizontal axis increase, and a section where the values of the vertical axis are uniform even when the values of the horizontal axis increase.

20. The method of claim 11, wherein (c) uses moving image compression technology.

21. A non-transitory recording medium having recorded thereon a program that when executed by a computing device causes the computing device to perform acts, comprising:
  (a) obtaining first data about a first image of a subject through long exposure;
  (b) obtaining second data about a second image of the subject through short exposure;
  (c) generating third data about a third image by warping the first data about the first image so that the subject of the first image and the subject of the second image are matched together; and
  (d) when a third data value at a pixel (x, y) of the third image is W(x, y) and a second data value at a pixel (x, y) of the second image is S(x, y), and |W(x, y)−S(x, y)| or a value obtained by processing |W(x, y)−S(x, y)| with regard to the pixel (x, y) of the second image satisfies a predetermined condition, amending the second data value S(x, y) at the pixel (x, y) of the second image so that the second data value S(x, y) at the pixel (x, y) of the second image has the third data value W(x, y) at the pixel (x, y) of the third image,
  wherein (d) is performed in each pixel (x, y) of the second image only when the third data value W(x, y) at the corresponding pixel (x, y) of the third image exists.

22. The method of claim 13, further comprising (e) storing the second data of the second image amended in (d) in a storage medium as final data.

23. A non-transitory recording medium having recorded thereon a program that when executed by a computing device causes the computing device to perform acts, comprising:
  (a) obtaining first data about a first image of a subject through long exposure;
  (b) obtaining second data about a second image of the subject through short exposure;
  (c) generating third data about a third image by warping the first data about the first image so that the subject of the first image and the subject of the second image are matched together; and
  (d) when a third data value at a pixel (x, y) of the third image is W(x, y) and a second data value at a pixel (x, y) of the second image is S(x, y), and |W(x, y)−S(x, y)| or a value obtained by processing |W(x, y)−S(x, y)| with regard to the pixel (x, y) of the second image satisfies a predetermined condition, amending the second data value S(x, y) at the pixel (x, y) of the second image so that the second data value S(x, y) at the pixel (x, y) of the second image has the third data value W(x, y) at the pixel (x, y) of the third image,
  wherein in the predetermined condition, the pixel (x, y) of the second image is in a bottom area of a pre-set first graph when the pixel (x, y) of the second image is shown on a coordinate system in which a horizontal axis is a gradient norm of W(x, y) or a value obtained by processing a gradient norm of W(x, y) and a vertical axis is |W(x, y)−S(x, y)| or a value obtained by processing |W(x, y)−S(x, y)|, and the pixel (x, y) of the second image is in a bottom area of a pre-set second graph when the pixel (x, y) of the second image is shown on a coordinate system in which a horizontal axis is a gradient norm of S(x, y) or a value obtained by processing a gradient norm of S(x, y) and a vertical axis is |W(x, y)−S(x, y)| or a value obtained by processing |W(x, y)−S(x, y)|.

* * * * *